United States Patent

[11] 3,612,624

[72] Inventor Robert N. Stedman
 Peoria County, Ill.
[21] Appl. No. 8,506
[22] Filed Feb. 4, 1970
[45] Patented Oct. 12, 1971
[73] Assignee Caterpillar Tractor Co.
 Peoria, Ill.

[54] TRACK-OVER-TIRE DRIVING ARRANGEMENT
 21 Claims, 9 Drawing Figs.
[52] U.S. Cl. ................................................. 305/19,
 152/182
[51] Int. Cl. .................................................. B62d 55/08,
 B60b 15/18
[50] Field of Search .......................................... 305/19, 35
 EB, 38, 57; 152/182, 183

[56] References Cited
 UNITED STATES PATENTS

| | | | |
|---|---|---|---|
| 2,764,211 | 9/1956 | Armington .................... | 152/182 |
| 2,917,095 | 12/1959 | Galanot ......................... | 305/19 |
| 3,355,224 | 11/1967 | Skanes .......................... | 305/57 |
| 2,046,299 | 6/1936 | Armington .................... | 305/19 |
| 2,764,208 | 9/1956 | Armington .................... | 152/182 |
| 2,764,210 | 9/1956 | Armington .................... | 152/182 |
| 2,764,212 | 9/1956 | Double .......................... | 152/182 |
| 2,973,995 | 3/1961 | Weier ............................ | 305/19 X |

FOREIGN PATENTS

| 327,249 | 3/1903 | France ........................ | 152/182 |

Primary Examiner—Richard J. Johnson
Attorney—Fryer, Tjensvold, Feix, Phillips & Lempio ABSTRACT: A track-over-tire driving arrangement comprises a pneumatic tire having a plurality of equally spaced notches formed on the periphery thereof. An endless track assembly, completely wrapped around the tire, comprises a plurality of closely coupled ground-engaging track shoes connected together by an annular articulated link assembly positioned on each side of the tire. A common pivot means pivotally connects laterally opposed pairs of links of the link assemblies together and is totally confined within a respective one of the notches for providing a mechanical drive connection between the tire and track assembly.

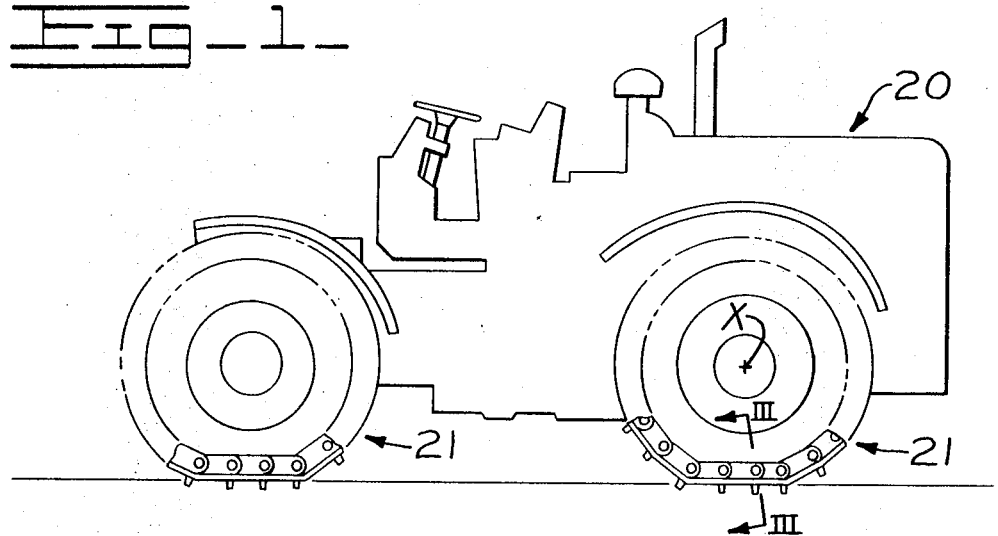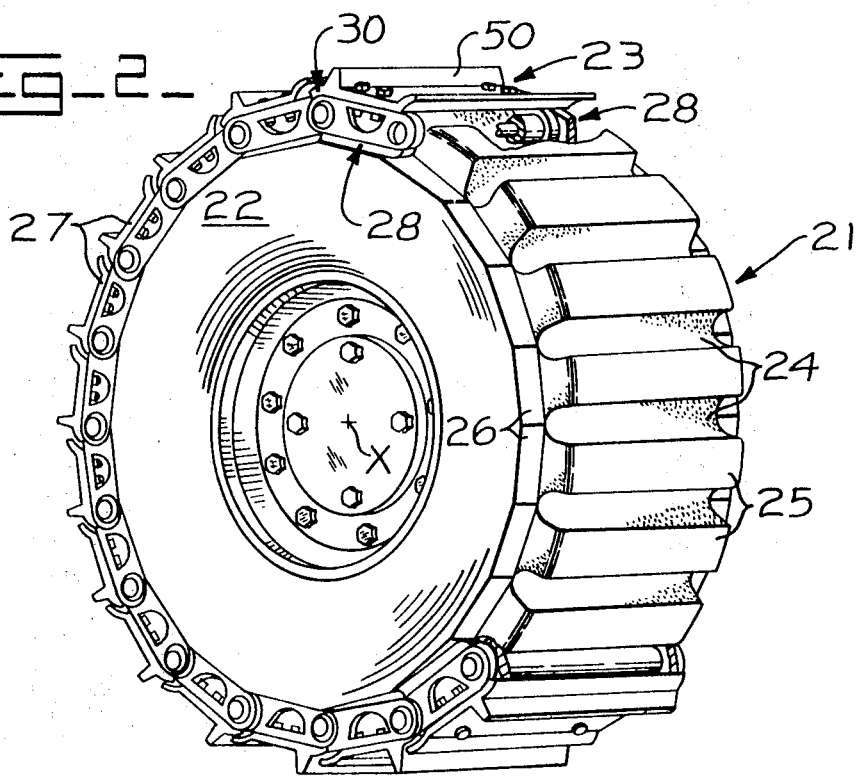

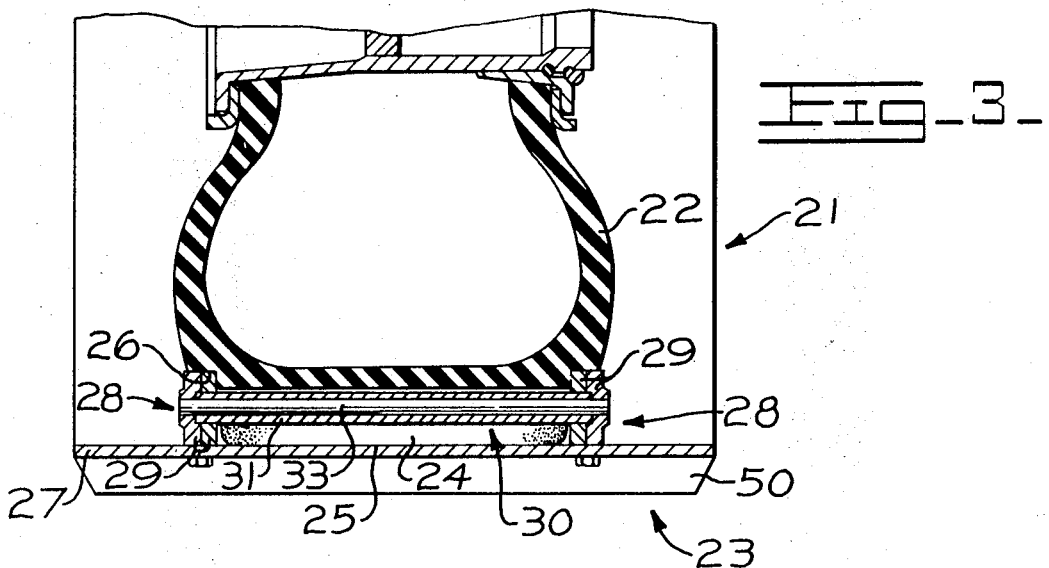
Fig-3-
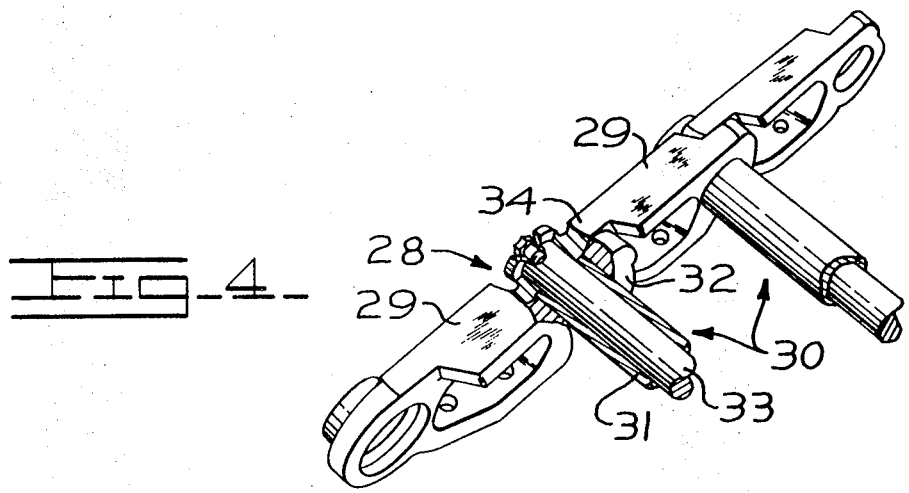
Fig-4-
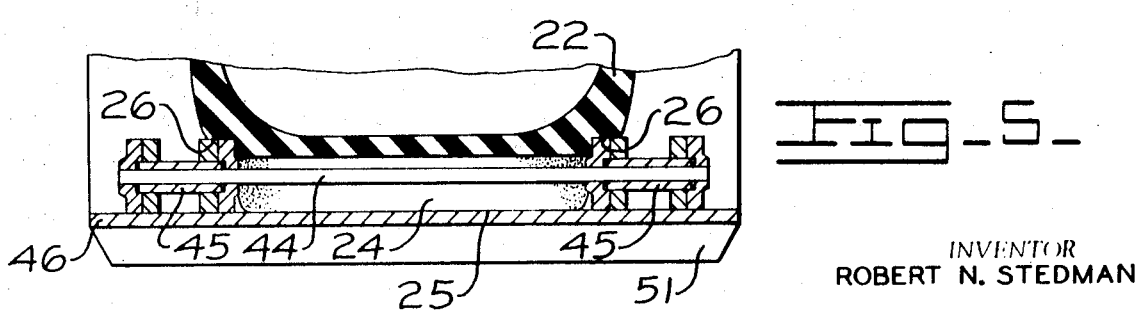
Fig-5-
INVENTOR
ROBERT N. STEDMAN

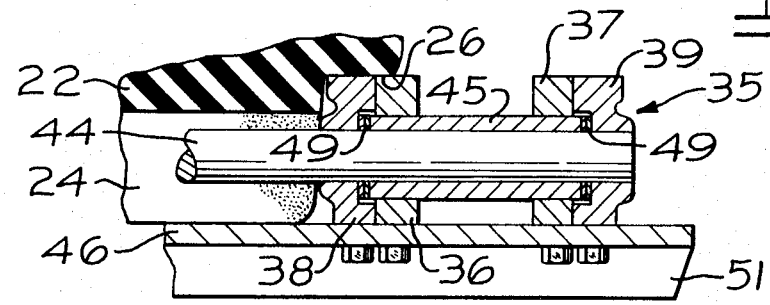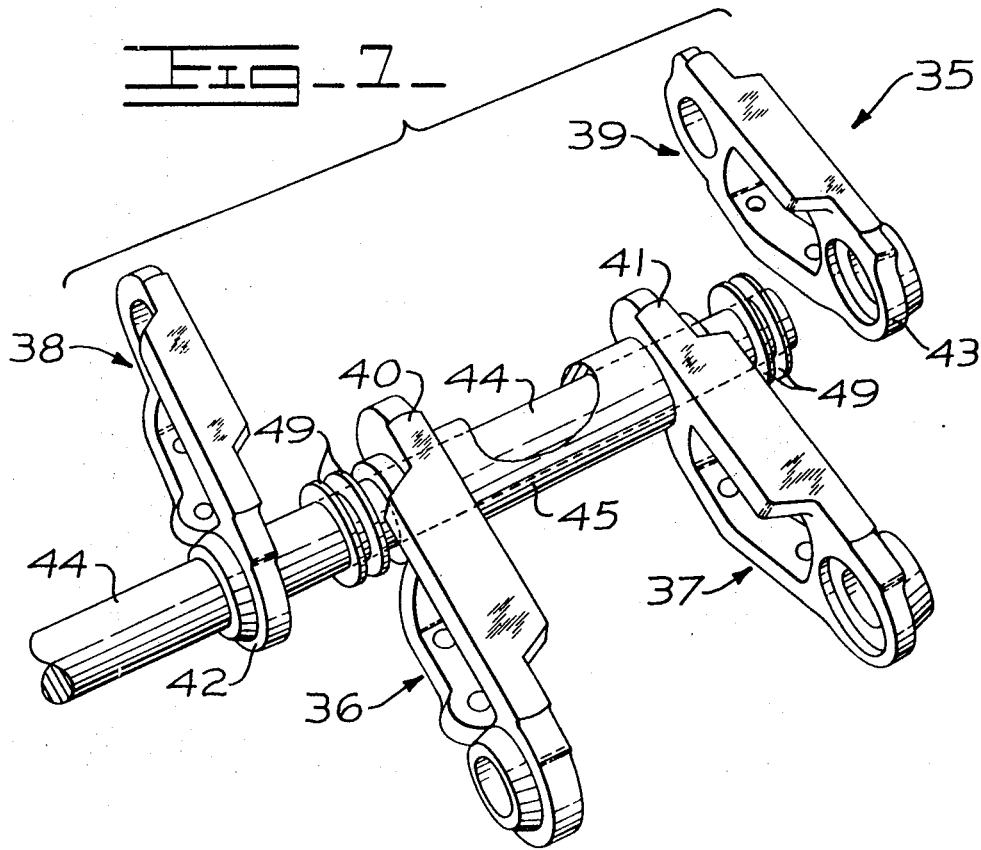

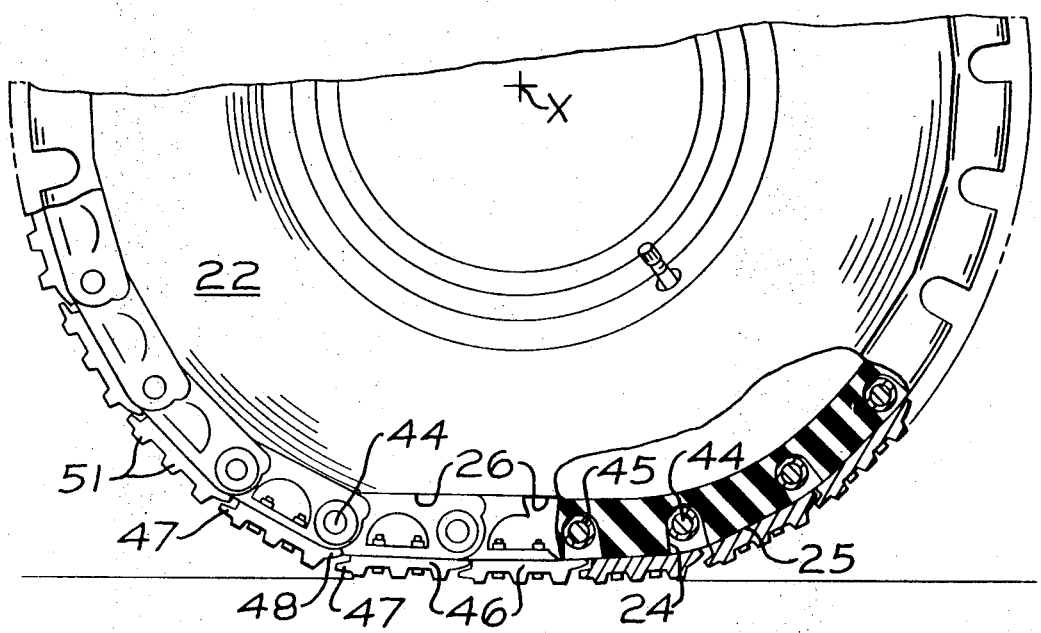
Fig-8-
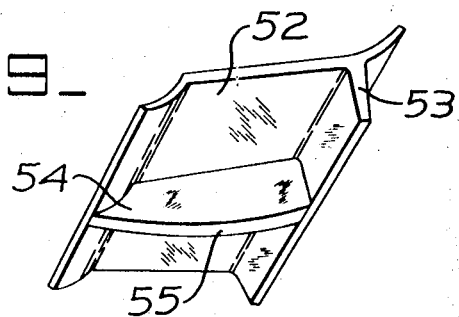
Fig-9-
INVENTOR
ROBERT N. STEDMAN

TRACK-OVER-TIRE DRIVING ARRANGEMENT

Various attempts have been made to protect the rubber tires of conventional earthmoving vehicles against damage by redesigning the tire or by armoring the tire with an encircling chain-type arrangement. Such tires are particularly prone to wear and damage when operated over sharp gravel or crushed or blasted rock of the type encountered in rock quarries and mines. Prior art armoring devices for tires generally tend to disadvantageously affect a vehicle's stability, speed capability, load carrying and working capacity and/or structural integrity.

An object of this invention is to overcome the above, briefly described problems by providing a track-over-tire driving arrangement exhibiting high protective and operating capabilities. The driving arrangement comprises an annular resilient spacer means, such as a pneumatic tire, having a plurality of notches formed on the periphery thereof. An endless track assembly is mounted around the spacer means and comprises a plurality of closely coupled ground-engaging shoes connected together by an annular articulated link assembly positioned on each side of the spacer means.

Each link assembly comprises a plurality of links and pivot means for pivotally connecting each circumferentially adjacent pair of links together. At least a portion of each of the pivot means extends at least partially into a respective one of the notches to mechanically engage therewith to provide a drive connection between the spacer means and track assembly.

Other objects of this invention will become apparent from the following description and accompanying drawings wherein:

FIG. 1 is a side elevational view of a conventional tractor, shown in outline form, mounted on four track-over-tire driving arrangements of this invention;

FIG. 2 is an isometric view of one of the driving arrangements of this invention;

FIG. 3 is a sectional view taken in the direction of arrows III—III in FIG. 1;

FIG. 4 is an isometric view of a portion of a link assembly employed in FIGS. 1–3 driving arrangement;

FIG. 5 is a view similar to FIG. 3, but showing an alternative driving arrangement;

FIG. 6 is an enlarged view of a portion of the FIG. 5 driving arrangement;

FIG. 7 is an exploded, isometric view of a portion of a link assembly employed in the FIGS. 5 and 6 driving arrangement;

FIG. 8 is a partially sectioned, side elevational view of the FIGS. 5–7 driving arrangement; and FIG. 9 is an isometric view illustrating an alternative form of a track shoe.

FIG. 1 illustrates a tractor 20 mounted on four track-over-tire driving arrangements 21 of this invention. The tractor may have various attachments mounted thereon for the performance of a wide variety of earthmoving or transport operations. For example, suitable attachments may be employed for bulldozing, loading or ripping operations. In addition, the driving arrangements of this invention may be employed on other types of machines such as scrapers or motor graders.

Referring to FIGS. 2–4, the illustrated driving arrangement embodiment comprises an annular resilient spacer means 22 having a substantially annular, preferably polygonal-shaped, endless track assembly 23 mounted completely therearound. The resilient spacer means may comprise an air-inflated rubber tire or air bag, for example, mounted on a conventional rim assembly. The rim may be suitably connected to the vehicle's drive axle or drive output (not shown) to be driven and rotated about a central axis X thereof by an internal combustion engine (not shown).

The illustrated pneumatic tire spacer means embodiment may be of standard construction comprising suitably integrated interliner, body plies and tread plies. A plurality of notches 24 are premolded or otherwise suitably formed on the tread portion of the tire and disposed to extend at least partially across the tire in the direction of the tire's central axis of rotation. The notches are preferably equally spaced circumferentially about the tire to define and separate a plurality of flat surface portions 25 disposed substantially parallel to the central axis. In addition, the tire is preferably premolded to comprise polygonal shaped and circumferentially connected shoulder portions 26 positioned on each side of the spacer means for purposes hereinafter described.

Endless track assembly 23 comprises a plurality of closely coupled ground-engaging shoes 27 circumferentially surrounding the spacer means. An annular, articulated link assembly 28 is positioned on each side of the spacer means and is bolted or otherwise suitably connected to the shoes to closely couple them together. Referring to FIG. 4, each of the link assemblies may comprise a plurality of single links 29 and pivot means 30 for pivotally connecting each circumferentially adjacent pair of links together.

The pivot means may comprise a bushing 31 press-fitted into a suitable bore formed through an inboard or first end portion 32 of a first one of the pair of links. A pin 33 is inserted through the bushing and press-fitted or otherwise suitably secured to an outboard, overlapping end portion 34 of an adjacent second link, as shown. The pivot means is thus arranged to permit limited relative pivotal movement to occur between each pair of adjacent links.

Referring to FIGS. 2 and 3, it should be noted that the pivot means is preferably common to laterally opposed pairs of links of the two link assemblies and is totally confined within a respective one of notches 24. The notches are preferably suitably sized (FIG. 8) to provide a slight clearance between the bushing and adjacent wall portions defining the notches. Such a clearance is desirable to compensate for the tendency of the tire to flatten out at the footprint area, shown in FIG. 8, when subjected to a load. In addition, such clearance provides a suitable manufacturing tolerance.

It can be seen that upon rotation of the track-over-tire driving arrangement that a positive mechanical drive connection will be assured between the tire and track assembly during all phases of operation. Although the pivot means is illustrated as extending fully laterally across the tire, it should be understood that the driving arrangement could be modified so that at least a portion of the pivot means extends only partially into a respective one of the notches to mechanically engage therewith. However, from a structural integrity and operational standpoint it is preferred that at least a portion of the pivot means extends fully across the tire to provide a common pivot axis for opposed pairs of the links of the two connected link assemblies.

It should be further noted in FIG. 3 that each of the link assemblies preferably extends radially inwardly a substantial distance from shoes 27 to abut side portions of the tire to prevent lateral movement thereof relative to the shoes. In addition, a major portion of each link is disposed to fully abut a respective one of shoulder portions 26, as clearly shown in FIG. 2.

FIGS. 5–7 illustrate a modified track assembly wherein a double-link assembly 35 is employed in lieu of single link assembly 28. As shown in FIG. 7, each link assembly comprises a plurality of laterally spaced first and second pairs of links 36–37 and 38–39, respectively. Each link of each pair of links overlaps an adjacent link of an adjacent pair of links so that inner overlapped first end portions 40 and 41 of the first pair of links 36 and 37, for example, are positioned within outer, overlapping second end portions 42–43 of the second pair of links 38–39. The resulting integrated construction of each link assembly presents substantially smooth and circumferentially continuous inboard surface portions or restraining means abutting side portions of the spacer means (FIG. 5). The pivot means for pivotally connecting the first end portions of the first pair of links to the second end portions of the second pair of links may comprise a pin 44 extending through the first pair of links and press-fitted into or otherwise suitably connected to second end portions 42–43 of the second pair of links. The second pair of links are thus attached together for simultaneous rotation about the longitudinal axis of the pin. A bearing bushing 45 is mounted for limited rotational movement relative to the pin by its press-fit connection to first end portions 40–41 of the first pair of links.

As shown in FIG. 5, pin 44 extends fully across the spacer means to provide a common pivotal connection between laterally opposed pairs of links of the two link assemblies. In addition, the pivot pin per se constitutes the primary mechanical drive connection between the tire and track assembly. In contrast thereto, the bushing 31 and pivot pin 33 combine to provide such a drive connection in the FIG. 3 embodiment.

Referring to FIG. 8, the longitudinal axis of each pin 44, as well as the longitudinal axis of each pin 33 of the FIG. 2 embodiment, is preferably positioned substantially parallel relative to central axis X and substantially intermediate a respective pair of adjacent shoes 46 connected together thereby. Such an arrangement facilitates a close coupling of the shoes together and also permits them to move into contact with the ground at the formed footprint in a substantially smooth and uninterrupted manner. In addition, the shoes are permitted to completely mask the periphery of the spacer means for tire protection and antidirt infiltration.

It should be further noted that first and second lugs 47 and 48 are formed integrally with each shoe, at respective ends thereof. The lugs function in conjunction with the above-described disposition of pin 44 to completely mask each other during rotation of the driving arrangement. In particular, first lug 47 of one shoe will substantially cover a second lug 48 of an adjacent shoe to protect the tire against damage and to prevent dirt infiltration during all phases of operation.

Although in certain applications the outer surface portions of the track shoes may be smooth and uninterrupted, i.e., void of grousers, the majority of earthworking applications require grousers for increased traction and related operating characteristics. The FIG. 2 track shoe 27, for example, employs a single grouser 50 disposed parallel to central axis X and extending radially outwardly relative thereto. The grouser extends at least substantially fully across the width of the shoe and is preferably positioned radially outwardly from and closely adjacent to pivotal connection 30.

Each of the shoes 46 of the FIG. 8 embodiment comprises three identical grousers 51 secured to the outer surface thereof and substantially equally spaced thereon. The FIG. 9 track shoe embodiment 52 is similar to shoe 27 (FIG. 2) in that it comprises a grouser 53 corresponding to grouser 50, but further comprises a cross-grouser 54 extending in a circumferential direction to be substantially perpendicular relative to grouser 53. Outer surface 55 of grouser 54 may be circumscribed by utilizing rotational axis X as its center. The FIG. 9 grouser arrangement is particularly useful for affording a smooth vehicle ride over hard materials. In addition, crossgrouser 54 will aid in preventing lateral sliding movements of the vehicle.

The above-described driving arrangement may be assembled by at least partially deflating the spacer means and then wrapping the uncoupled track assembly therearound. A suitably sized "master pin" may be employed in each of the link assemblies to facilitate such uncoupling. Alternatively, a breakable link of the type disclosed in U.s. Pat. No. 3,427,079 could be utilized for coupling and uncoupling purposes. The loose ends of the track assembly may be drawn together by a suitable cinch or the like to align the mating "master pin" retaining bores of such ends. Once the "master pin" is pressfitted in place the spacer means or pneumatic tire may be inflated to the desired pressure level. The magnitude of such level will largely determine the degree to which the spacer means is compressed at flat surface portions 25 thereof by the track shoes.

I claim:

1. An annular resilient and deformable spacer means, having a generally transversely flat outer periphery, mounted for rotation about its central axis and having means forming a plurality of transversely extending notches on the periphery thereof, said notches extending across said periphery in the direction of said central axis, and an endless track assembly mounted completely around said spacer means, said track assembly comprising a plurality of generally flat closely coupled ground-engaging track shoes circumferentially surrounding and in compressed intimate contact with said spacer means and an annular articulated link assembly positioned radially inwardly along and adjacent to each side of said spacer means and connected to said shoes to closely couple them together, each of said link assemblies comprising a plurality of links and pivot means pivotally connecting each circumferentially adjacent pair of links together, said pivot means extending between each of said link assemblies across said outer periphery and at least partially into a respective one of said notches to mechanically engage therewith.

2. The invention of claim 1 wherein said portion of said pivot means is totally confined within said notch.

3. The invention of claim 1 wherein each of said notches is slightly larger than a respective one of said portions of said pivot means.

4. The invention of claim 1 wherein said spacer means comprises an air-inflated, rubberlike tire member.

5. The invention of claim 1 wherein each of said link assemblies comprises a plurality of single links with each circumferentially adjacent pair of links being overlapped and connected together by said pivot means.

6. The invention of claim 1 wherein said shoes have widths defining outboard portions extending a substantially equal lateral distance beyond a respective one of said side portions, each of said link assemblies connected to a respective one of said shoe's outboard portions closely adjacent to a respective one of side portions of said spacer means.

7. The invention of claim 1 wherein the periphery of said spacer means comprises a plurality of circumferentially spaced flat portions disposed substantially parallel to said central axis, each adjacent pair of said flat portions being separated by a respective one of said notches.

8. The invention of claim 1 wherein said spacer means further comprises polygonal shaped and circumferentially connected shoulder portions positioned on each side of said spacer means to accommodate a respective one of said articulated link assemblies thereon.

9. The invention of claim 1 wherein said portion of said pivot means comprises a pivot pin.

10. The invention of claim 9 wherein said pivot means further comprises a bushing having said pivot pin mounted for relative rotation therein.

11. The invention of claim 1 wherein each of said link assemblies comprise a plurality of laterally spaced pairs of links, each link of each pair of links overlapping an adjacent link of an adjacent pair of links so that inner overlapped first end portions of a first pair of links are positioned within outer overlapping second end portions of an adjacent second pair of links, said pivot means pivotally connecting the first end portions of said first pair of links and the second end portions of said second pair of links together.

12. The invention of claim 11 wherein said pivot means comprises a pin connecting the second end portions of said second pair of links together, and a bushing mounted for limited rotational movement relative to a longitudinal axis of said pin and connecting the first end portions of said first pair of links together, whereby said resilient spacer means and said endless track assembly are unitized to rotate as a unit about the central axis thereof.

13. The invention of claim 11 further comprising a sealing means mounted at each end of said pivot means for sealing purposes.

14. The invention of claim 11 wherein the longitudinal axis of each pin is positioned substantially parallel relative to said central axis and further positioned substantially intermediate a pair of adjacent shoes.

15. The invention of claim 14 further comprising a lug means formed on each end of each shoe to be substantially parallel with respect to the longitudinal axis of said pins for continuously and completely overlapping a lug means of an adjacent shoe whereby the entire peripheral portion of said spacer means is completely masked during rotation thereof.

16. The invention of claim 1 wherein outer surface portions of each of said shoes are flat and uninterrupted.

17. The invention of claim 16 further comprising at least one grouser secured to the outer surface portions of each of said shoes to extend radially outwardly therefrom and away from said central axis.

18. The invention of claim 17 wherein three of said grousers are secured to the outer surface portions of each of said shoes and are substantially equally spaced thereon circumferentially about said central axis.

19. The invention of claim 17 wherein said grouser extends in a circumferential direction and is substantially perpendicular relative to said central axis.

20. The invention of claim 17 wherein said grouser extends laterally in the direction of said central axis and at least substantially fully across the width of said shoe.

21. The invention of claim 20 wherein said grouser is positioned radially outwardly from and closely adjacent to the pivotal connection for each connected, adjacent pair of links.